Aug. 8, 1939   G. W. MÜLLER   2,169,109
AIR COOLING MEANS FOR DRY RECTIFIERS
Filed July 8, 1936
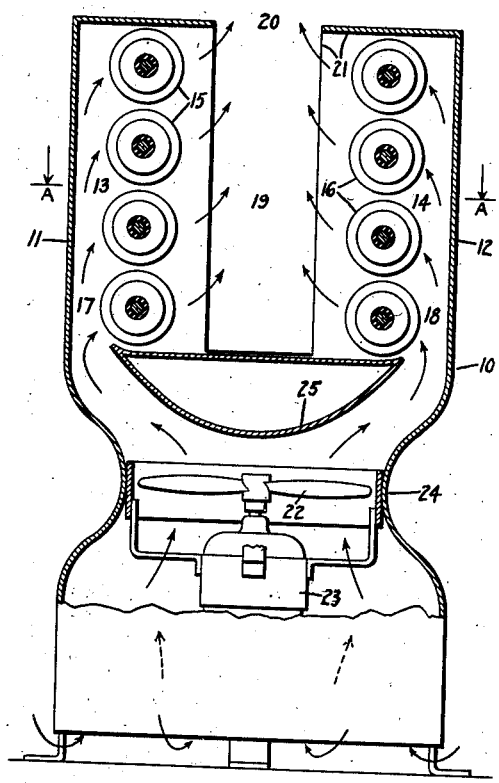
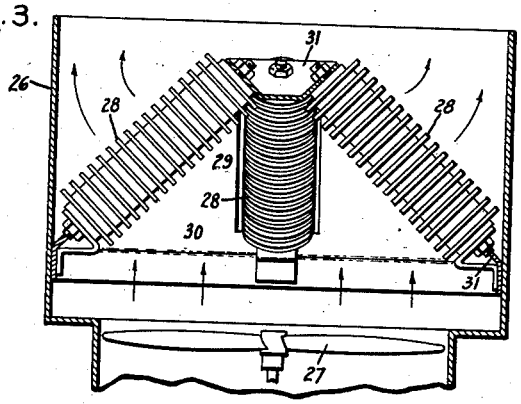
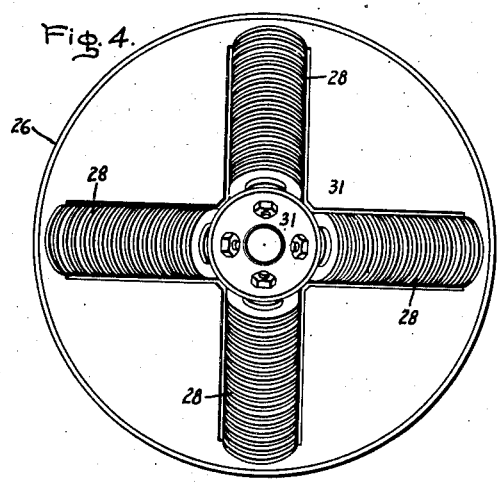
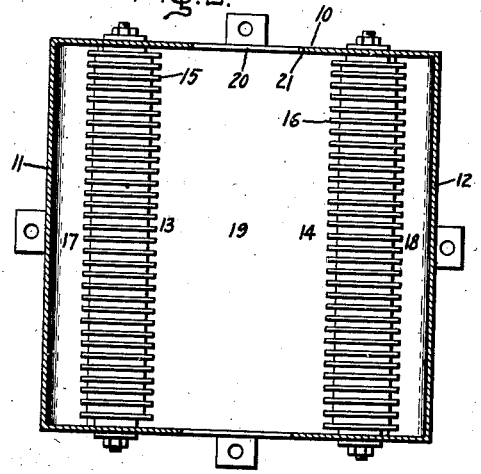
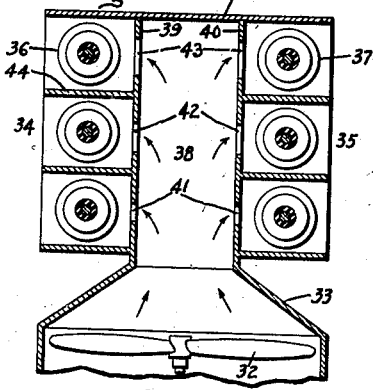
Inventor:
Gustave W. Müller,
by Harry E. Dunham
His Attorney.

Patented Aug. 8, 1939

2,169,109

UNITED STATES PATENT OFFICE 2,169,109

AIR COOLING MEANS FOR DRY RECTIFIERS

Gustav W. Müller, Berlin-Charlottenburg, Germany, assignor to General Electric Company, a corporation of New York Application July 8, 1936, Serial No. 89,627
In Germany August 2, 1935

6 Claims. (Cl. 175—366)

My invention relates to current rectifiers of the dry disk type, and particularly to air cooling means for such apparatus whereby efficient and uniform cooling of the rectifier active elements is provided and relatively large current outputs are obtained from the rectifier apparatus without danger of damage due to undue and uneven rise of temperature of the active elements.

When a relatively large number of stacks of dry rectifiers are arranged adjacent each other and with some of the stacks behind others in an air conducting shaft through which a strong air current is caused to flow by means of a blower or cooling fan, the rectifier elements of those stacks which are nearest to the fan are cooled more than are the elements of the stacks which are farthest from the fan and through which flows air already heated by the air from the stacks nearer the fan. As a result, the elements of the stacks which are farther from the fan acquire a higher temperature than that of the other stacks and, because of the resulting difference in internal resistance of the rectifier elements which varies with temperature, an unequal distribution of the current and voltage occurs among the different stacks of rectifier elements.

It is, therefore, the principal object of the present invention to provide cooling arrangements for dry rectifier apparatus in which the above noted disadvantage is avoided. In accordance with my invention this result is accomplished by means which supply cooling air to all of the rectifying elements at substantially the same temperature and velocity.

My invention will be better understood from the following description when considered in connection with the accompanying drawing and its scope will be set forth in the appended claims.

Referring to the drawing, Fig. 1 is an elevational view, partially in section, of a rectifier apparatus embodying cooling means in accordance with my invention; Fig. 2 is a cross-sectional view on line A—A of Fig. 1; Fig. 3 is a sectional, elevational view of a rectifier apparatus embodying a modification of my invention; Fig. 4 is a top plan view of the embodiment shown in Fig. 3; and Fig. 5 is a sectional, elevational view of a further modification of my invention.

In Figs. 1 and 2 the numeral 10 designates a rectifier casing adjacent the opposite walls 11, 12 of which are mounted respectively rectifier banks 13, 14 each comprising a plurality of rectifier stacks 15, 16. The stacks of each bank are arranged preferably closely adjacent to each other and with their axes parallel. The banks of rectifier stacks are respectively so arranged with reference to the casing side walls 11, 12 that air conducting spaces 17, 18 of relatively large volume and sufficiently wide to provide substantially unobstructed passage of cooling air are formed between the rectifier banks and the side walls. The banks of rectifier stacks are, further, so spaced with reference to each other that an air space 19 is formed centrally of the casing 10 of such width as to permit substantially unobstructed passage of cooling air. A relatively large opening 20 is formed centrally of the end and top walls 21 of casing 10 for the passage of the cooling air which flows in space 19.

To cause a flow of cooling air through the rectifier stacks 15, 16 a blower or cooling fan 22 driven by a motor 23 is mounted in a preferably constricted portion 24 of the casing 10 adjacent to one extremity of the rectifier banks, which are preferably arranged vertically, the fan 22 and motor 23 being preferably mounted below the rectifier banks. To cause the cooling air to flow between the outer spaces 17, 18 and the fan, an air-guiding or deflecting element or partition 25, preferably of convex form in the direction of the fan, is mounted between the rectifier banks 13, 14 and the fan 22 and is spaced from the casing side walls 11, 12.

The transformer (not shown) required to supply current to the rectifier banks may be mounted in the casing 10 on the opposite side of the fan from the deflector 25 in order that the transformer may be in the path of the cooling air. The rectifier stacks 15, 16 may comprise elements of circular form as shown, or the elements may be eight-, six- or four-sided.

In Figs. 3 and 4 the numeral 26 designates a cylindrical casing in which is mounted a cooling fan or blower 27 to cause a flow of air through the casing. In the casing are mounted a plurality of rectifier stacks 28 obliquely arranged with reference to each other to form a rectifier bank 29 of pyramidal form. Between the base of the pyramidally shaped rectifier bank 29 and the blower 27 is an air space 30 of relatively large volume to insure even distribution of the cooling air to the stacks 28. Internal walls or partitions 31 are provided within the casing 26 to insure that the current of cooling air produced by fan 27 shall be directed substantially through the rectifier stacks 28 only.

In Fig. 5 the arrangement is similar to the arrangement shown in Figs. 1 and 2 in that a cooling fan or blower 32, mounted in a casing 33, causes a flow of cooling air through rectifier banks 34, 35 constituted respectively by a plurality of parallelly mounted rectifier stacks 36, 37 spaced apart on either side of a central air shaft or space 38 of relatively large volume. In Fig. 5, however, partitions or separating walls 39, 40 are mounted between the rectifier banks 34, 35 and the central air space 38, and openings 41, 42, 43 are provided to permit flow of air between the rectifier banks and the fan 32 through the air space 38. Partitions 44 are mounted between adjacent stacks of each bank, and the casing 33 is closed at the end opposite the fan by a wall 45. To equalize still further the cooling effect of the air flow on the different rectifier stacks the openings 41, 42, 43 are graduated in area, the smallest, 41, being for example nearest the fan 32 and the largest, 43, then being farthest from the fan.

In operation of the embodiment shown in Figs. 1 and 2, the blower means or fan 22 causes a flow of cooling air through the casing 10, the current preferably having the direction indicated by the arrows and the apparatus being arranged vertically as illustrated. The air blast is directed by deflector 25 to the side spaces 17, 18, thence through the rectifier stacks 15, 16 constituting the rectifier banks 13, 14, and out through the central air space 19 and the casing opening 20. By appropriate spacing and shaping of the surfaces which form the different air spaces the resistance to air flow can be made sufficiently low through the casing 10 to insure that cooling air of substantially the same temperature and velocity is supplied to the different rectifier stacks.

In operation of the modification shown in Figs. 3 and 4 cooling air is caused by fan 27 to flow, preferably in the direction of the arrows, through the cylindrical casing 26. The air from the fan flows to the relatively large air space 30 and thence through the stacks 28, the internal partitions 31 causing the air to pass through the rectifier stacks only. By reason of the oblique mounting of the stacks a relatively large number of rectifier elements may be provided in a casing of a given diameter and at the same time the relatively large air spaces on opposite sides of the rectifier bank 29 of pyramidal form are such as to permit the supplying of cooling air of substantially the same temperature and velocity to all of the stacks.

In operation of the modification shown in Fig. 5 the fan 32 causes a flow of cooling air in the air space 38 through the openings 41, 42, 43 in partitions 39 and 40, and through the rectifier stacks 36 and 37. Preferably the apparatus is mounted vertically and the direction of air flow is preferably in the direction of the arrows, upwardly from fan 32 and into the central space 38, laterally through the openings 41, 42, 43, thence through the stacks 36 and 37 and out of the sides of the casing 33. By means of the partitions or separating walls 44 and the openings 41, 42, 43 of graduated area in partitions 39, 40, the flow of cooling air is so controlled that the stacks at the top, remote from the fan are as efficiently cooled as the stacks beneath and nearer to the fan, the openings being progressively larger from the lower opening, near the fan, to the upper opening remote from the fan. Any air pressure drop in central air space 38 due to friction losses is thus compensated.

It will be understood that in the embodiment shown in Fig. 5 the same effect of equal cooling of all of the rectifier stacks may be attained by mounting air flow impedances, similar in function to the partitions 39, 40 having openings of graduated size, in the path of the air flowing from or after passing through the stacks 36, 37, the central air space 38 then being correspondingly arranged, if desired, without air flow impedance means.

My invention has been described herein in particular embodiments for purposes of illustration.

It is to be understood, however, that the invention is susceptible of various changes and modifications and that by the appended claims I intend to cover any such modifications as fall within the true spirit and scope of my invention.

What I claim as new and desire to secure by Letters Patent of the United States is:

1. A rectifier apparatus including a casing, a blower mounted in said casing, two banks of rectifier stacks of the dry disk type mounted opposite each other in said casing and spaced respectively a substantial distance from opposite walls of said casing to form air passages between said banks and said walls, said banks being spaced apart to form an air passage therebetween, a blower mounted in said casing, and a deflector mounted in said casing between said banks and said blower to cause a blast of cooling air induced by said blower to flow across one of said banks and through the passages corresponding to said bank and to cause a second blast of cooling air induced by said blower to flow across the other of said banks and through the passages corresponding to said other bank.

2. A rectifying apparatus including a cylindrical casing, a plurality of rectifier stacks of the dry disk type mounted in said casing to form a rectifier bank of pyramidal form, and means including a blower mounted in said casing to cause a current of cooling air to flow through said casing and across said stacks.

3. A rectifying apparatus including a plurality of rectifier stacks of the dry disk type, means including a blower to cause a current of cooling air to flow across said stacks, and a plurality of air flow impedance means mounted respectively in the cooling air paths corresponding to said stacks and so arranged that the cooling effect of said current on said stacks is equalized.

4. A rectifying apparatus including a casing, two banks of rectifier stacks of the dry disk type mounted opposite each other in said casing and spaced to form a central air passage therein, a blower mounted in said casing to cause a current of cooling air to flow therein, partition means in said casing to cause said current to flow in separate paths across said stacks, and partition means in said paths provided with openings of graduated area to cause the cooling effect of said current on said stacks to be equalized.

5. A rectifier apparatus including a casing, a blower mounted in said casing, two banks of a single row each of rectifier stacks of the dry disk type mounted opposite each other in said casing and spaced a substantial distance from opposite outside walls of said casing to form air passages between said rows and said walls, said rows being spaced apart to form an air passage therebetween centrally of said casing, a blower mounted in said casing, and a deflector mounted in said casing between said banks and said blower to cause a blast of cooling air induced by said blower to flow through said passages and across said stacks.

6. A rectifying apparatus including a casing, a blower mounted in said casing and adapted to provide a cooling air current therethrough, a plurality of stacks of rectifiers of the dry disk type mounted in said casing, and air flow impedance means mounted between the inlet and outlet air passages of said casing, said casing, said blower, said stacks, and said air flow impedance means being so arranged that the cooling effect of said current on said stacks is equalized.

GUSTAV W. MÜLLER.